June 29, 1937.  E. A. LENK  2,085,372
COMBINED CAKE BASE AND SLICER
Filed Aug. 1, 1936
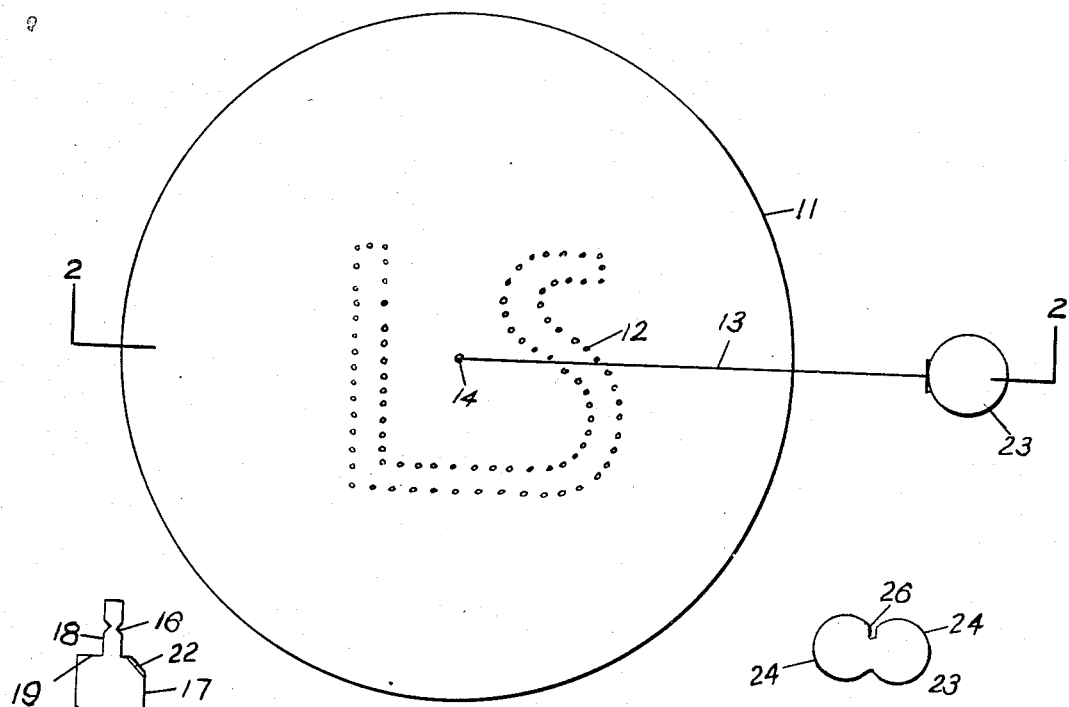
FIG. 1
FIG. 7
FIG. 8
FIG. 2
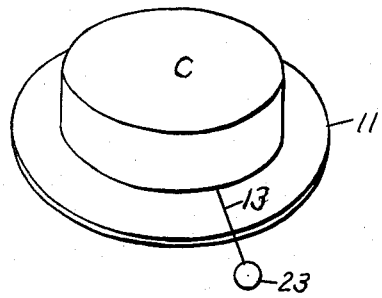
FIG. 3
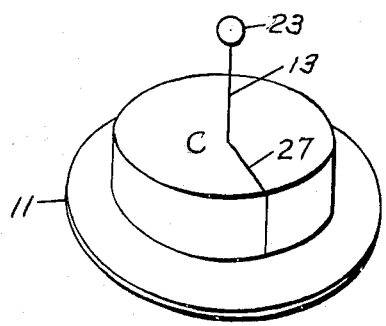
FIG. 4
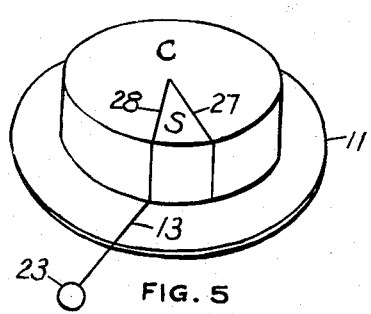
FIG. 5
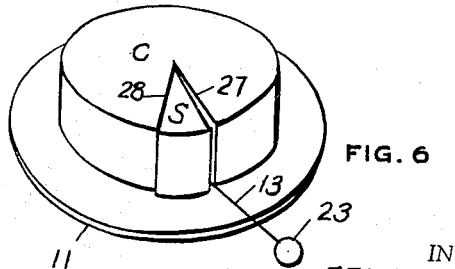
FIG. 6
INVENTOR.
ERNEST A. LENK
BY
ATTORNEY.

Patented June 29, 1937

2,085,372

UNITED STATES PATENT OFFICE 2,085,372

COMBINED CAKE BASE AND SLICER

Ernest A. Lenk, Philadelphia, Pa., assignor of one-half to George H. Morningstar, Philadelphia, Pa.

Application August 1, 1936, Serial No. 93,839

3 Claims. (Cl. 146—129)

This invention relates to cake mounting and slicing means, and particularly to a base for the mounting of an individual cake, and in which there is associated means for slicing the cake as it rests on said base.

This invention contemplates the mounting and slicing of cakes of regular dimensions, such as round, square, pentagonal, hexagonal, octagonal and the like, and wherein the cake will remain on its mounting as the slices are severed, and until the entire cake has been disposed of.

The object of the invention is to provide cheap, simple and efficient cake mounting means incorporating therewith means for slicing the same.

A further object of the invention is to provide a base for the mounting of a cake, and to which base, means are attached for slicing the cake mounted thereon, and in which the base with the mounted cake may be deposited in the regular cake box, or the base may be incorporated as part of a sealed package, in accordance with the container shown and described in my co-pending application Serial No. 41,672, filed September 23, 1935.

Another object of the invention is to provide cake mounting means incorporating slicing means wherein the cost of same will enable it to be marketed along with the ordinary cake without raising the price of said cake.

According to the invention, the base of any desired shape is provided with indentations for receiving a binder for retaining a cake in place thereon, wire means having one end fixed to the center of said base, and of such length as to extend over the periphery of said base, and means on the free end of said wire means for operating same.

The drawing shows an embodiment of the invention, and the views therein are as follows:—

Figure 1 is a top plan view showing a round base with the slicing means in position, Figure 2 shows a cross-sectional view on the line 2—2 of Figure 1, Figure 3 is a perspective view showing the base with a cake mounted thereon, and the slicing means extending out from the periphery of said base, Figure 4 is a perspective view showing the means of cutting a cake by raising the slicing wire to vertical position, Figure 5 is a like view showing the next downward movement of the wire to cut the sides of a cake slice, Figure 6 is a like view showing the movement of the wire to detach the cut slice of cake from the base, Figure 7 shows a developed view of one means for attaching the cutting wire to the base, and Figure 8 shows a developed view of the operating tab which is located on the free end of the slicing wire.

As illustrated in the drawing, the base 11 may be formed of cardboard or other substantially rigid material. The board, however, preferably has a glazed upper face to protect the cake mounted thereon. The upper face of the base is provided with indentations 12 which preferably fracture the smooth upper surface of the base and extend part way into the body thereof, as shown in Figure 2.

While the base shown in the drawing is round, it will be understood that this base may be of any desired shape, for instance, square, pentagonal, hexagonal, octagonal, etc., and the invention is not limited to the shape thereof.

The slicing wire 13 is fixed by its one end to the center of the base. In the particular type shown in the drawing this slicing wire extends down through a hole 14 at the center of the base, and is wrapped around the reduced or notched part 16 of the securing means or clip 17. The extension 18 of the clip is then bent down on the line 19 until it comes in contact with the body 21 of said securing means. Two of the corners of said body 21 are bent at right angles to said body to form tangs 22. These tangs are pressed into the bottom of the base 11, as shown in Figure 2.

Of course this method of securing the slicer to the center of the base while feasible and effective is only one means for accomplishing same, and in many instances, it will be found advisable to secure the end of the slicer directly onto the top of the base 11 by clip, staple or otherwise. The slicer 13 is of such length that it may extend over the periphery of the base 11, and its outer end is provided with a tab 23. Figure 8 shows a developed view of this tab, and same is comprised of substantially two circular parts 24 having one side grooved, as at 26, so that the outer or free end of the slicing wire may be wrapped around the reduced part thereof and the substantially circular parts 24 then brought together so as to retain the end of the wire therebetween.

The perspective views Figures 3 to 6 inclusive illustrate the operation of the slicer for severing slices of cake from the cake body.

Let us assume that a cake has been mounted on the base, as shown in Figure 3; the method of mounting comprises the smearing of icing or the like onto the top of the base and in contact with the indentations 12 whereupon the cake C is placed thereon causing it to adhere firmly to said base upon the drying of the icing, etc. Assuming that the cake has now been securely fixed to the base with the slicer 13 in the position shown in Figure 3, and it is desired to cut a slice of cake from the body thereof, the tab 23 is grasped between the thumb and forefinger and the slicer 13 raised to a vertical position. This will cause a cut from the periphery of the cake clear through to its center, as shown at 27 in Figure 4. By drawing the tab slightly to the right or left and then lowering the same so that it again rests along the base 11, an additional cut 28 will be made, as shown in Figure 3. Since the cake is fastened to the base, it is now necessary to draw the tab in an arcuate direction to release the slice S from said base. The tab may then again be raised and an additional downward and arcuate movement will sever another slice from the cake. It will be understood that the cake mounted on the base, and as shown in Figure 3, may be placed in an ordinary cake box for marketing, and that mounted on the base, the sides and top will be protected against contact with the box provided the box is of sufficient height. It will also be readily understood that the cake mounted on the base 11 may be incorporated into many styles of co-called hermetically sealed packages, and as illustrative, I refer to the package shown and described in my co-pending application hereinbefore mentioned.

The slicing device offers many additional uses for the mounting of cakes and the like, and provides a sanitary cake slicing means incorporated in the original package.

Of course, the combined cake mounting base and slicer illustrated and described may be modified in various ways without departing from the invention herein set forth and hereafter claimed.

The invention is hereby claimed as follows:—

1. A cake mounting comprising a base, a fine flexible wire fixed by its one end to a clip, said clip fixed to the center of said base and on the bottom thereof, said wire extending through a hole in the center of said base and being free, except for the end secured to said clip, said wire being of such length as to extend beyond the outer edge of said base.

2. A cake mounting comprising a base, a fine flexible wire fixed by its one end to a clip, said clip having tongues to secure same into the bottom of said base, said wire extending through a hole in the center of said base and being free, except for the end secured to said clip, said wire being of such length as to extend beyond the outer edge of said base.

3. Cake mounting means comprising a flat base and a fine flexible wire permanently fixed by its one end directly to the center of said base and its other end free for operation at various angles for slicing a cake mounted on said base, said base having its upper surface unobstructed except for said wire, and said wire being of such length as to extend beyond the outer edge of said base.

ERNEST A. LENK.